(12) United States Patent
Aranzulla et al.

(10) Patent No.: US 7,243,948 B2
(45) Date of Patent: Jul. 17, 2007

(54) GAS BAG WITH A DISCHARGE OPENING

(75) Inventors: Daniele Aranzulla, Schwaebisch Gmuend (DE); Bernd Issler, Urbach (DE)

(73) Assignee: TRW Automotive GmbH, Alfodorf (DE)

( * ) Notice: Subject to any disclaimer, the term of this patent is extended or adjusted under 35 U.S.C. 154(b) by 0 days.

(21) Appl. No.: 11/312,881

(22) Filed: Dec. 20, 2005

(65) Prior Publication Data

US 2006/0163854 A1 Jul. 27, 2006

(30) Foreign Application Priority Data

Jan. 26, 2005 (DE) ...................... 10 2005 003 703

(51) Int. Cl.
*B60R 21/16* (2006.01)
(52) U.S. Cl. .................................. 280/743.1
(58) Field of Classification Search ............. 280/743.1, 280/730.1, 728.1
See application file for complete search history.

(56) References Cited

U.S. PATENT DOCUMENTS

| | | |
|---|---|---|
| 5,246,250 A | 9/1993 | Wolanin et al. |
| 5,405,166 A | 4/1995 | Rogerson |
| 5,447,330 A | 9/1995 | Tagawa et al. |
| 5,931,497 A | 8/1999 | Fischer |

FOREIGN PATENT DOCUMENTS

| | | |
|---|---|---|
| DE | 4335809 | 5/1994 |
| DE | 29609703 | 11/1996 |
| EP | 0670247 | 9/1995 |
| EP | 1044855 | 10/2000 |
| EP | 1393989 | 3/2004 |
| GB | 2302845 | 2/1997 |
| JP | 07329694 | 12/1995 |

*Primary Examiner*—Faye M. Fleming
(74) *Attorney, Agent, or Firm*—Tarolli, Sundheim, Covell & Tummino LLP

(57) ABSTRACT

A gas bag for a vehicle occupant restraint arrangement includes an inner fabric layer (16), a middle fabric layer (20) and an outer fabric layer (18) lying one over another. Each fabric layer (16, 20, 18) has a section in which at least one opening (10, 14, 12) is formed. The overlapping of the sections with the openings (10, 14, 12) form a discharge opening of the gas bag. The section of the middle fabric layer (20) is movable relative to the sections of the inner and outer fabric layers (16, 18) depending on the internal pressure of the gas bag and thereby altering the cross section of the discharge opening.

7 Claims, 2 Drawing Sheets

GAS BAG WITH A DISCHARGE OPENING

TECHNICAL FIELD

The invention relates to a gas bag for a vehicle occupant restraint arrangement, in particular to a gas bag having at least one discharge opening.

BACKGROUND OF THE INVENTION

In a gas bag having a discharge opening it is desirable for the discharge opening to remain closed, as far as possible, during the inflation process, so that the quantity of gas necessary to completely fill the gas bag can be kept low. It is desirable in addition to match the hardness of the gas bag to the respective circumstances. As is known in the art, this can be achieved by altering the cross-section of the discharge opening depending on the internal pressure of the gas bag. In this way, if the unfolding gas bag comes into contact prematurely with the vehicle occupant or with an obstacle, a discharging of gas is permitted during the unfolding phase. Furthermore, through the pressure-dependent opening of the discharge opening, the stress of the vehicle occupant, who is plunging into the gas bag, can be influenced in a regulating manner, in particular with regard to his body weight.

British Patent Application GB 2 302 845 A shows a gas bag having a discharge opening which is closed by a covering sewn on the gas bag. When the vehicle occupant plunges into the gas bag, the covering may be detached by a tension means fastened to the covering, in order to open the discharge opening.

From European Patent Application EP 1 393 989 A1 it is likewise known to secure a discharge opening by a flap which is fastened to the gas bag wall. The flap is only detached when a particular internal pressure is exceeded. The discharge opening, which is formed by several cuts in the gas bag wall, is smaller than the discharge cross-section which results after the detachment of the flap.

A gas bag for a vehicle occupant restraint arrangement having a discharge opening which is formed by an overlapping of openings in several layers of fabric lying one over another is known from German Utility Model DE 296 09 703 U1. The layers of fabric are moveable relative to each other depending on the internal pressure of the gas bag.

The outer fabric layer has a gathered region which is secured by a tear seam. This seam tears open or not, depending on how much gas is provided by a multiple-stage gas generator for filling the gas bag. On tearing open, the outer fabric layer moves with its opening relative to the opening of the inner fabric layer, whereby the effective discharge cross-section is altered.

It is an object of the invention to provide a gas bag which makes possible an automatic and very variable adaptation of the hardness of the gas bag without such additional measures.

BRIEF SUMMARY OF THE INVENTION

A gas bag for a vehicle occupant restraint arrangement according to the invention includes an inner fabric layer, a middle fabric layer and an outer fabric layer lying one over another. Each fabric layer has a section in which at least one opening is formed. The overlapping of the sections with the openings form a discharge opening of the gas bag. The section of the middle fabric layer is moveable relative to the sections of the inner and outer fabric layers depending on the internal pressure of the gas bag. Thereby the cross section of the discharge opening is altered.

The displacement of the middle fabric layer permits an alteration of the alignment of the openings in the individual fabric layers, which can be defined beforehand. Thereby, a reversible adaptation of the effective discharge cross-section can be achieved, depending on the internal pressure of the gas bag, without a tear seam or a multiple-stage gas generator necessarily being required for this.

The inner and the outer fabric layers are preferably connected with each other such that an intermediate space is formed therebetween in which the middle fabric layer is arranged, the middle fabric layer being connected at one point both with the inner fabric layer and also with the outer fabric layer. In such a construction, the inner and the outer fabric layers expand "in synchronism" with each other as the internal pressure of the gas bag increases, whereas the middle fabric layer only undergoes an expansion at the connection point, such that the relative displacement of the openings with respect to each other is thereby produced.

According to a preferred embodiment, the middle fabric layer is connected in a center section with the inner and the outer fabric layers.

In order to largely prevent a discharging of gas until the gas bag is fully unfolded, the opening of the middle fabric layer, in the inflated state of the gas bag without external intervention, is to be arranged staggered with respect to the openings of the inner and the outer fabric layers.

The inner and the outer fabric layers are preferably connected with each other by a seam or glued portion or the like entirely surrounding the middle fabric layer, in order to prevent another escape of the gas.

It is also possible to provide a plurality of openings which correspond with each other, respectively, can also be provided in each of the fabric layers.

DETAILED DESCRIPTION OF THE PREFERRED EMBODIMENT

Figure 1:
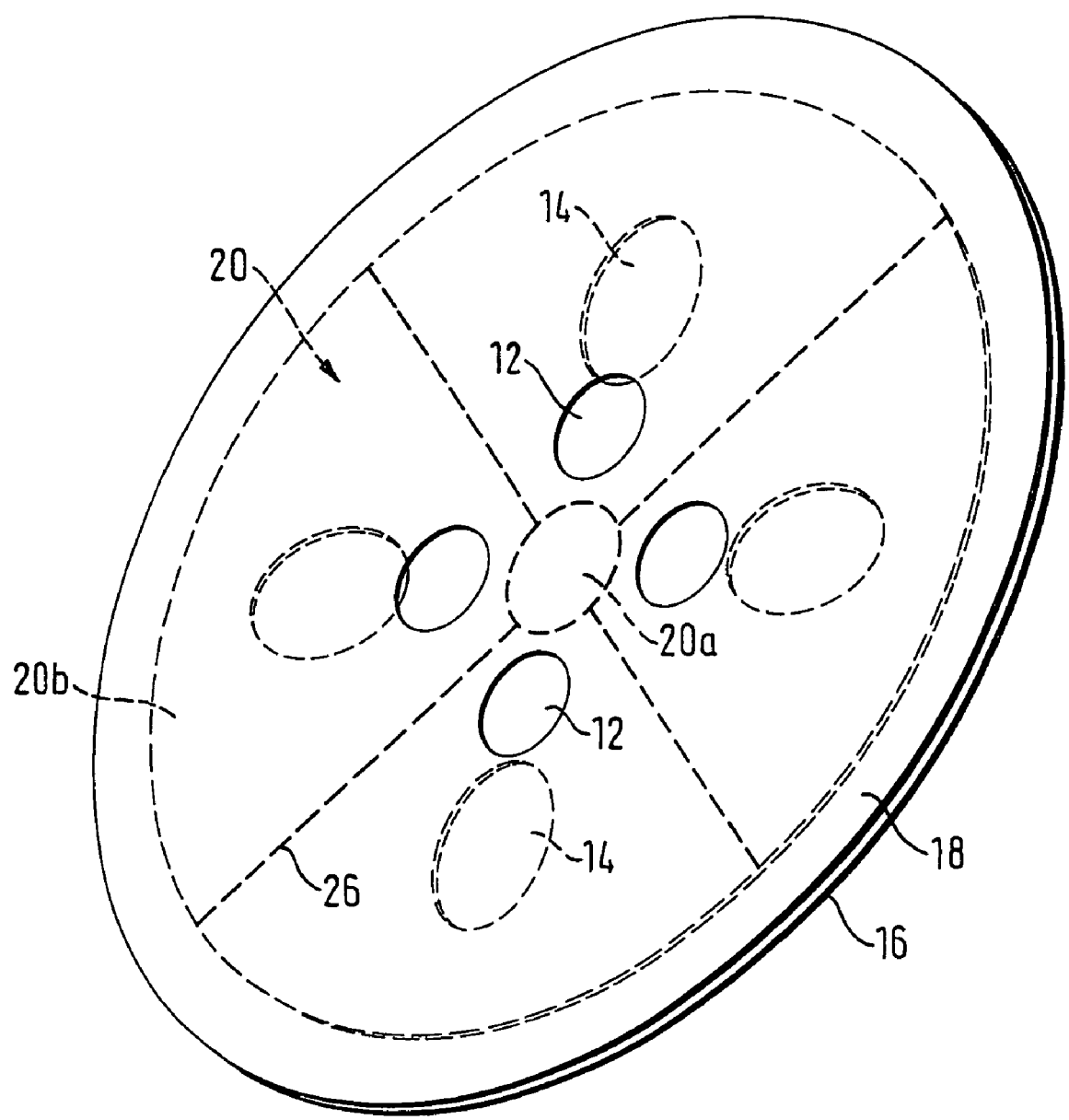
FIG. 1 shows a perspective view of a portion of a gas bag according to the invention, with a transparent upper fabric layer.
Figure 2:
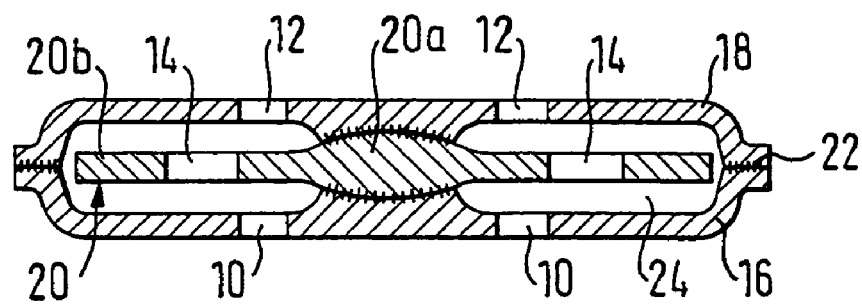
FIG. 2 shows a diagrammatic cross-sectional view of the part in FIG. 1, with the inflated gas bag.

In FIGS. 1 and 2 a portion of a gas bag is illustrated, in which a discharge opening is provided. The discharge opening is composed of several openings 10, 12, 14 which are formed in various fabric layers 16, 18, 20.

The structure of the discharge opening can be seen in particular from FIG. 2. In the region of the discharge opening, the gas bag has an inner fabric layer 16 and an outer fabric layer 18 which are connected with each other by a circular seam 22 or glued portion or the like. An intermediate space 24 which is circular in top view and the height of which is represented on an enlarged scale in FIGS. 2 to 5 for the sake of clarity, is formed between the inner and outer fabric layers 16, 18.

In the intermediate space 24, a middle fabric layer 20 is arranged, which is only connected with the inner and the outer fabric layers 16, 18 at its center section 20a, i.e. the radially outer margin section 20b lies loosely between the inner and the outer fabric layers 16, 18.

Each of the three fabric layers 16, 18, 20 has several openings 10, 12, 14, respectively, which are associated with each other. In the inflated state of the gas bag, which is shown in FIG. 2, the openings 10, 12 of the inner and the outer fabric layers 16, 18 are indeed in alignment with each other, but the openings 14 of the middle fabric layer 20 lie completely staggered with respect to the openings 10, 12 of the inner and the outer fabric layers 16, 18. Thereby, practically no effective discharge cross-section is present, i.e. the discharge opening is closed to the largest extent.

As the internal pressure of the gas bag increases, the sections of the inner and outer fabric layers 16, 18 with their openings 10, 12, adjoining the intermediate space 24, expand in a similar manner owing to the connection of the inner and the outer fabric layers 16, 18 to the edge of the intermediate space 24. However, as the middle fabric layer 20 is only connected to the other fabric layers 16, 18 at its center section 20a, only this section 20a of the middle fabric layer 20 expands, whereas the outer margin section 20b with the openings 20 does not undergo an expansion. Thereby, a relative displacement of the openings 14 of the middle fabric layer 20 takes place with respect to the (expanded) openings 10, 12 of the inner and the outer fabric layers 16, 18.

Figure 3:
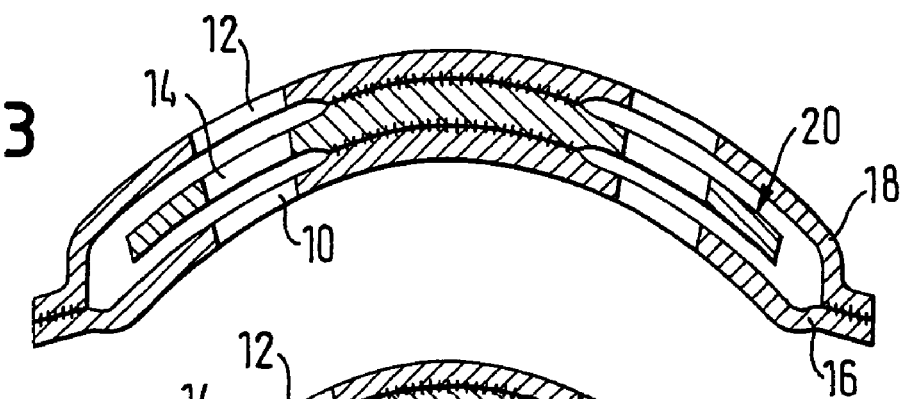
FIGS. 3 to 5 show the view of FIG. 2 with different stresses of the gas bag.

FIG. 3 shows the inflated gas bag with a low stress, such as can occur for example when a light vehicle occupant plunges into the gas bag. The position of the openings 14 of the middle fabric layer 20 is selected such that in this case they are in alignment with the openings 10, 12 of the inner and the outer fabric layers 16, 18. The discharge cross-section therefore has the maximum possible size, so that the gas bag becomes distinctly softer.

Figure 4:
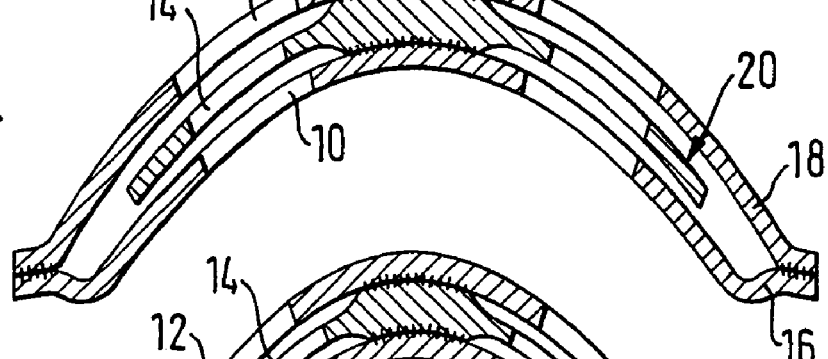

With a stronger stress, such as is shown in FIG. 4, the discharge cross-section becomes reduced because the openings 10, 12, 14 are no longer entirely in alignment with each other. In this way, the quantity of gas which is being discharged is reduced. The internal pressure of the gas bag then corresponds to the desired internal pressure for the impact of a heavy vehicle occupant.

Figure 5:
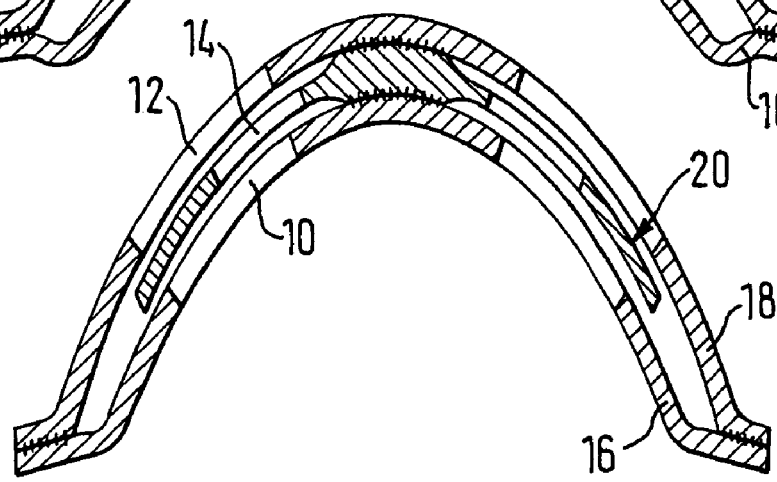

In FIG. 5 the gas bag is illustrated in the case of a very high stress. The discharge cross-section is still further reduced compared with the case shown in FIG. 4, so that a "bottoming" of the gas bag is prevented.

As shown in FIG. 1, the middle fabric section 20 can also be further connected with the inner and the outer fabric layers 16, 18 by radial seams 26 or glued portions or the like, without the operating principle of the discharge openings described above being thereby altered.

The invention claimed is:

1. A gas bag for a vehicle occupant restraint arrangement, the gas bag including an inner fabric layer, a middle fabric layer and an outer fabric layer lying one over another, each fabric layer having a section in which at least one opening is formed, the overlapping of the sections with the openings forming a discharge opening of the gas bag, the section of the middle fabric layer being movable relative to the sections of the inner and outer fabric layers depending on the internal pressure of the gas bag and thereby altering the cross section of the discharge opening.

2. The gas bag according to claim 1, wherein the inner and the outer fabric layers are connected with each other such that an intermediate space is formed therebetween in which the middle fabric layer is arranged, the middle fabric layer being connected at one point both with the inner fabric layer and also with the outer fabric layer.

3. The gas bag according to claim 2, wherein the middle fabric layer is connected at a center section with the inner and the outer fabric layers.

4. The gas bag according to claim 1, wherein the opening of the middle fabric layer, in the inflated state of the gas bag without external intervention, is arranged staggered to the openings of the inner and the outer fabric layers.

5. The gas bag according to claim 1, further comprising a connection that interconnects the inner and the outer fabric layers, the connection entirely surrounding the middle fabric layer so that the middle fabric layer is arranged completely within an intermediate space which is formed between the inner and the outer fabric layers and laterally limited by the connection.

6. The gas bag according to claim 1, wherein the middle fabric layer is substantially circular.

7. The gas bag according to claim 1, wherein a plurality of openings corresponding with each other, respectively, are provided in each of the fabric layers.

* * * * *